Aug. 18, 1925.

G. W. KNOX 1,550,266

MERCHANT SIGNALING DEVICE

Filed March 24, 1923     2 Sheets-Sheet 1

INVENTOR.

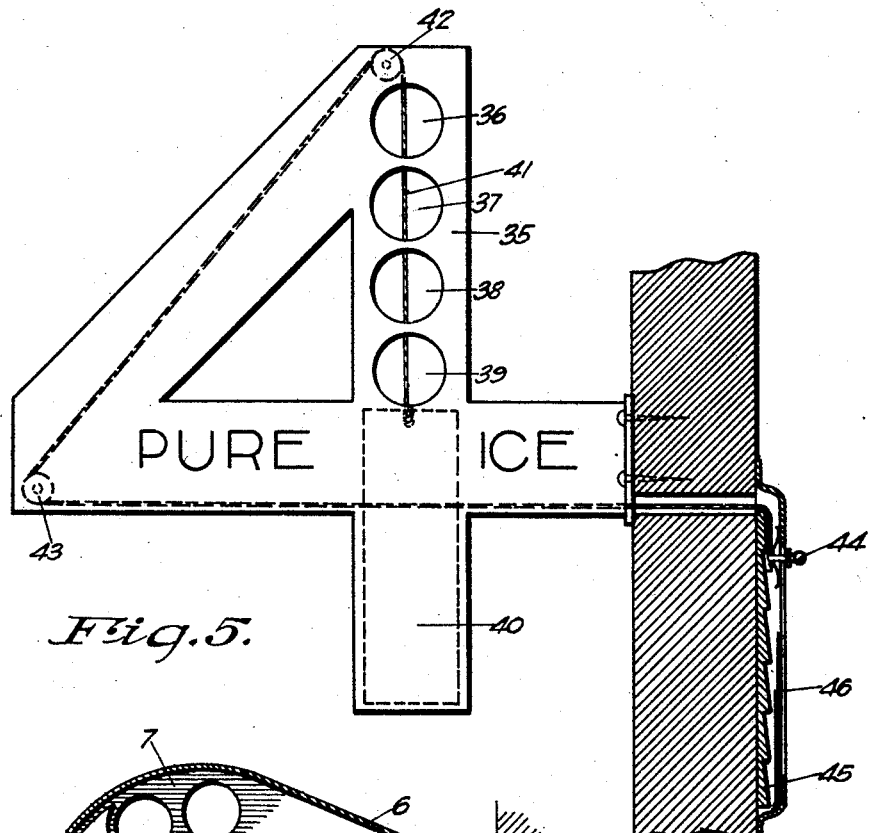
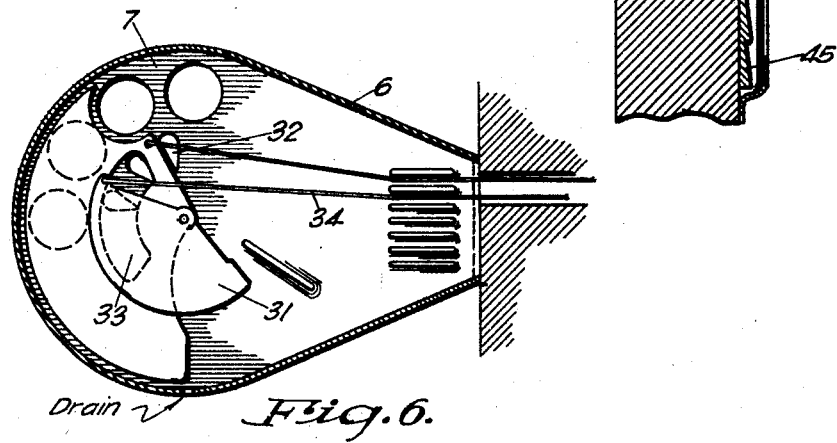

Patented Aug. 18, 1925.

1,550,266

UNITED STATES PATENT OFFICE.

GEORGE W. KNOX, OF OKLAHOMA CITY, OKLAHOMA.

MERCHANT SIGNALING DEVICE.

Application filed March 24, 1923. Serial No. 627,461.

*To all whom it may concern:*

Be it known that I, GEORGE W. KNOX, a citizen of the United States, residing at Oklahoma City, in the county of Oklahoma and State of Oklahoma, have invented a certain new and useful invention in Merchant Signaling Devices, of which the following is a specification, reference being had to the accompanying drawings.

This invention relates to an ice-man, grocery-man or bread-man signaling semaphone, and while the invention has been especially designed for these purposes, it is, of course, to be understood that the invention may have a more general application, and may be put to such uses as may be deemed wise or essential.

Among the important objects of the invention are those which provide for rotating a signal upon a pivot; intervening an aperture with the same, and using the closed aperture as a means of indication with or without the elements of classification, so that either by classification or simply pre-understanding, the wish of the user may be determined by the one from whom materials or service as desired.

Other objects of the invention will appear from a further and more complete reading of the following specification, claims and drawings, in connection with the latter—

Figure 1 indicating perspectively a portion of building and an embodiment of the device applied;

Figure 5 is a view in elevation of a modified form of the invention, and

Figure 6 is a view in elevation and in section of the device in duplex signaling features.

In these several views, similar characters of reference indicate similar parts.

Figure 1:
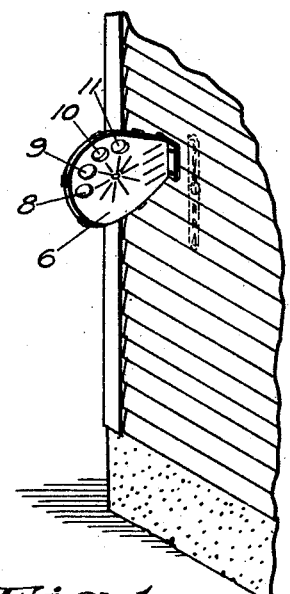
Figure 3:
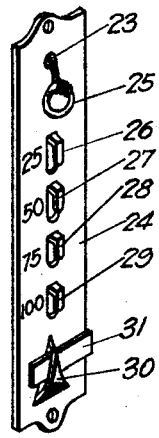
Figure 3 is a perspective detail of a graduated plate to be employed in connection with the device if desired.
Figure 4:
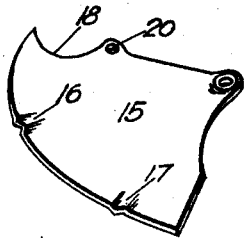
Figure 4 is a perspective detail of a plate used in connection with the device.

Primarily, as generally intimated, the crossing of the field of an aperture as a means of indication is elementary in the invention, and, of course, this may be accomplished in any suitable manner. In the present instance, this is brought about by the provision of a suitably formed casing or chamber 6, including a semi-circular race 7, and the walls of this casing are to be provided with a plurality of apertures, in the present instance, 8, 9, 10 and 11. In order to stabilize the casing 6, the walls thereof may be corrugated at will, as seen at 12, and preferably radially for ornamental and efficiency design, and in the formation of the casing guides 13, and reinforcing corrugations 12 may be indented at will.

Figure 2:
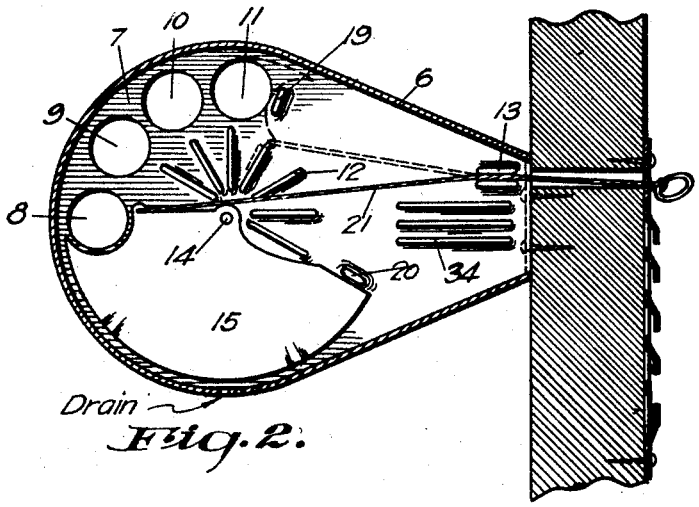
Figure 2 is a vertical section of the same.

Within the casing 6, and upon a pivot 14 is a plate 15 suitably formed upon itself to provide guides 16 and 17 for not only positioning the plate within the walls of the casing, but also for providing antifriction points for the same as it is moved upon said pivot and along the inside walls of the casing. This plate is also provided with a cut-away portion 18 so that when laid at rest or in an inoperative position it will clear the first or lower aperture 8, hereinbefore mentioned. To properly arrest the plate in either of its extreme positions stops 19 and 20 are formed during the formation of the casing, in the wall of the casing as seen for instance in Figure 2.

Suitably associated with the plate, for instance at 20 is a cable 21, adapted to pass between the guides 13, passing through the fastening plate 22 and through the wall of the building, and through an opening 23 in a plate 24 and the same is provided with a retainer 25.

This plate 24 is provided with a series of retainers 26, 27, 28 and 29 suitably designated laterally thereof, in the present instance, although this designation may be anywhere placed, and these retainers are so disposed upon the plate, and the plate so properly disposed that when the plate 18 crosses aperture 8, for instance, the retainer 25 will be hooked in retainer 26, and so on, as will be obvious.

A clip is provided for holding a check 31, or element of instruction or any other item.

While discussing this arrangement, reference is now made to Figure 6, in which, in addition to the parts thus far described, an additional plate 31, pivoted to the bearing 14 is provided, to cover an opening 32 in the wall of the casing, and for the accommodation of which a slot 33 is provided in the plate 15. This plate is provided with a cable 34 passing through guides 35 constituted of the struts for strengthening the plate of the casing and this cable may be cared for in any suitable way, and the object of this structure is that in addition to the signal for graduated quantities of merchandise, such as ice, the milk or bread man may also be signaled to serve.

A modified form of the invention is disclosed in Figure 5, and constitutes a structure 35, having openings 36, 37, 38, and 39 across each field of which is adapted to pass an element 40, in the form of a gravitating device, and which may be under the control of a cable 41 attached to same and passing over a sheave 42, and about a sheave 43 before receiving a retainer 44, spring actuated to cooperate with a plate 45, suitably graduated to correspond with the openings 36, 37, 38 and 39, so that as these graduations were met by the spring actuated element 44 the weight 40 could be held in place at will over the field of any of the openings desired. Covering the spring actuated element 44 is a plate 46 for protecting the same, and said spring is provided with a slot through which the handle of the same may travel in operation.

It will now appear from the general description of this invention that there is provided a novel means of arresting attention to the want of merchandise and at the same time to indicate the amount desired and provide for payment of same.

Having thus described this invention, I claim:

1. A merchandise purchase indicating device, comprising an oval casing having a front plate and a back plate, the said front plate having a plurality of openings near one end thereof, a signal member pivotally mounted in the walls of the frame and having an opening clearance, a stop formed within the frame for limiting the movement of the signal, a cable running from the signal and through the frame, guides for the cable, and means to hold the cable-end when the signal is moved to cover one or more of the openings.

2. A casing comprising two fan shaped sides having openings, an end enclosing wall, a moving flag pivoted substantially central of the casing, a cord carried by the flag and substantially remote from the pivot to form leverage, bearings for the flag formed in the side walls of the casing, stops formed in the side wall of the casing for the flag, means for guiding the cable through the casing, and graduated instrumentalities for holding the cord to position the flag relatively to the openings.

Signed at Oklahoma City, in the county of Oklahoma and State of Oklahoma, this 15th day of March, in the year of our Lord, nineteen hundred and twenty-three.

GEO. W. KNOX.